June 23, 1970   A. J. DE MARIA   3,517,332
FREQUENCY MODULATION FOR LASERS
Original Filed April 16, 1963   3 Sheets-Sheet 3

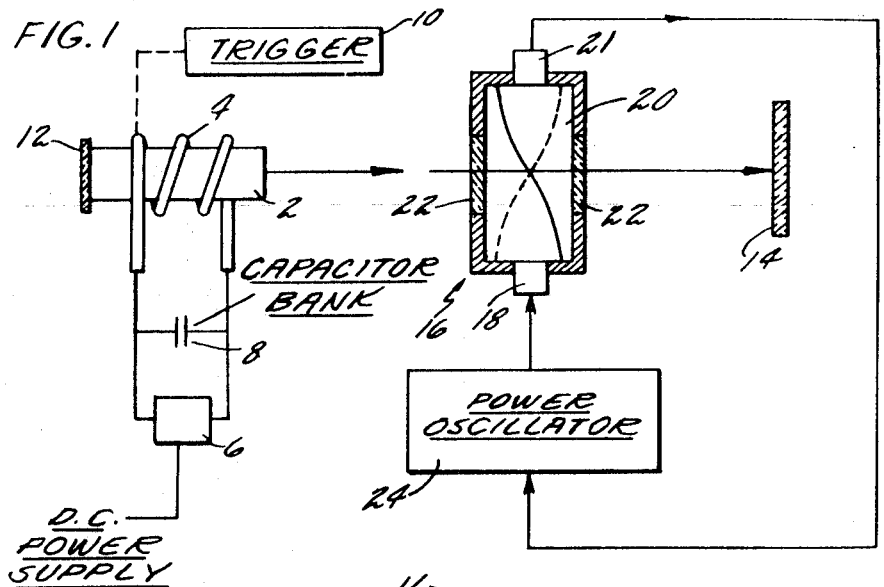
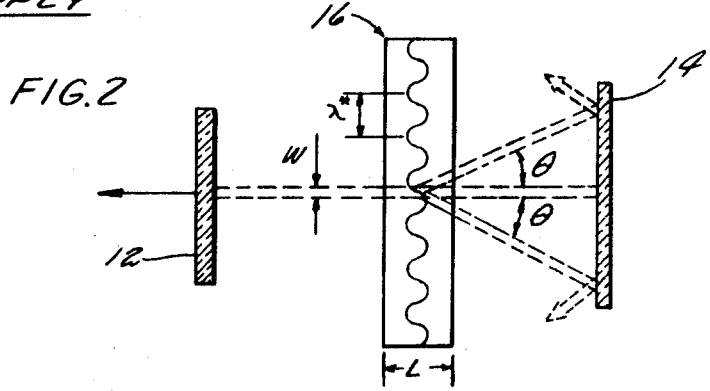
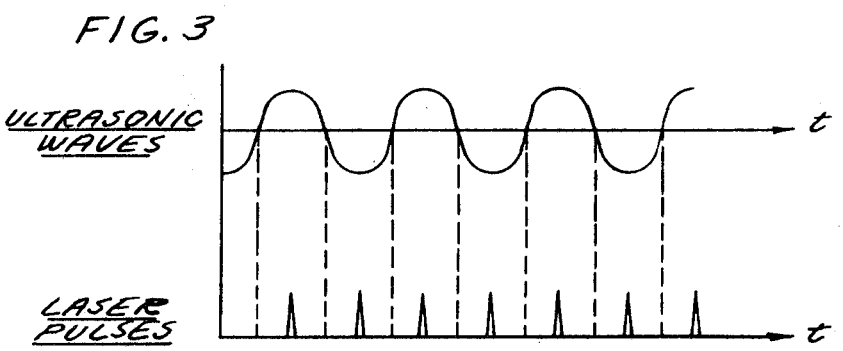
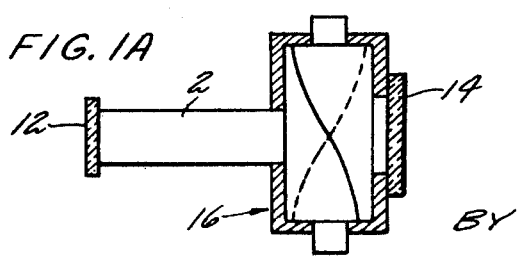

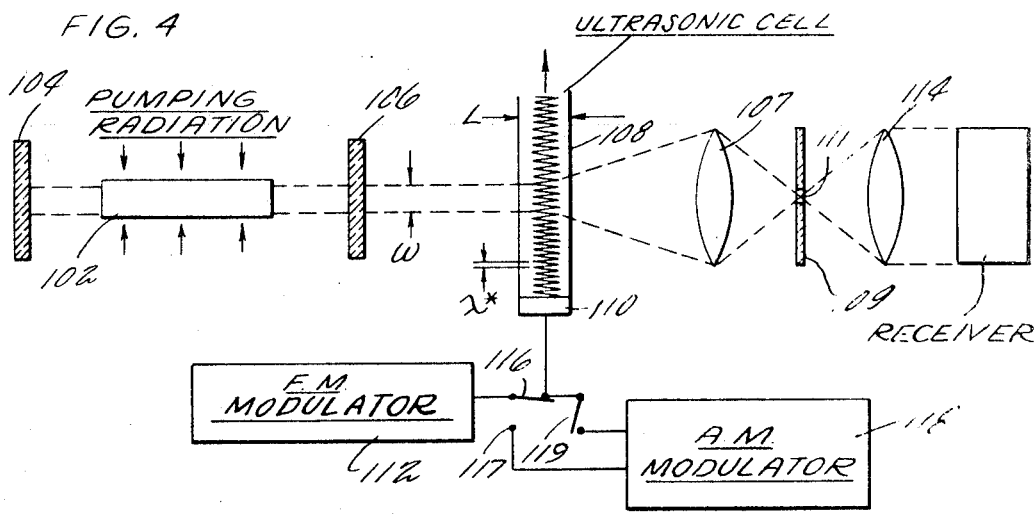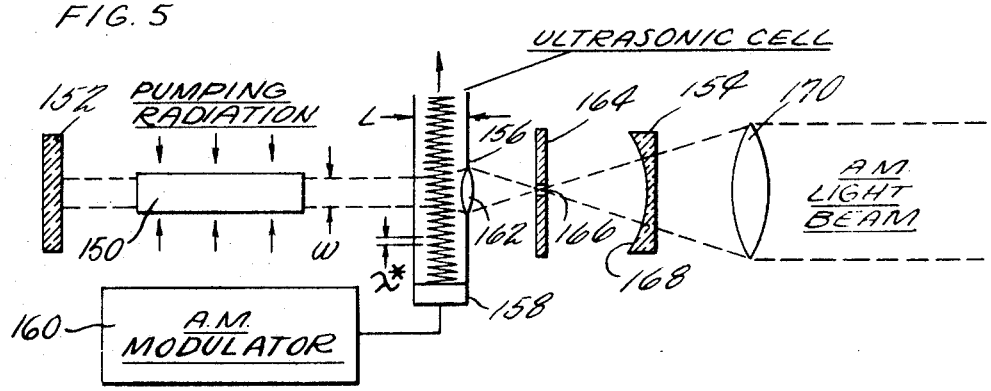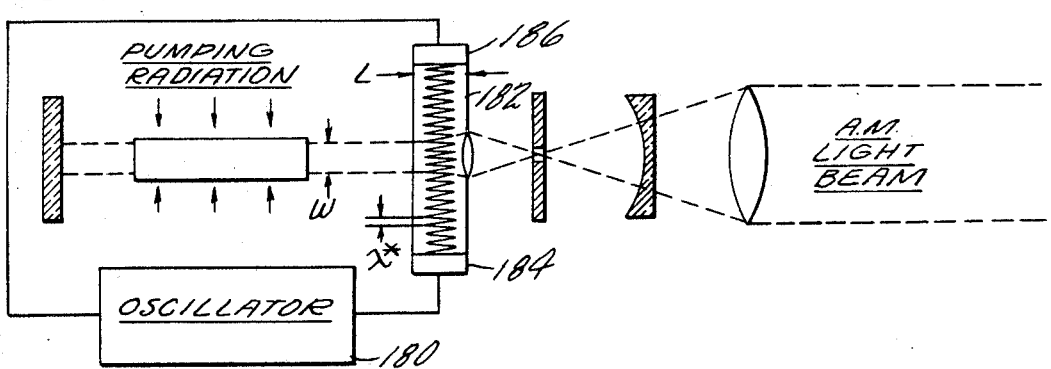

INVENTOR
ANTHONY J. DeMARIA
BY Donald J. Bradley
ATTORNEY

United States Patent Office
3,517,332
Patented June 23, 1970

3,517,332
FREQUENCY MODULATION FOR LASERS
Anthony J. De Maria, West Hartford, Conn., assignor to United Aircraft Corporation, East Hartford, Conn., a corporation of Delaware
Original application Apr. 16, 1963, Ser. No. 273,514, now Patent No. 3,297,876, dated Jan. 10, 1967. Divided and this application Nov. 16, 1966, Ser. No. 618,571
Int. Cl. G02f *1/28;* H01s *3/00*
U.S. Cl. 331—94.5                                6 Claims

ABSTRACT OF THE DISCLOSURE

An acoustic cell is positioned in the path of a laser beam, and a frequency modulated input signal is applied to the cell to generate therein an acoustic wave which propagates perpendicular to the laser beam. The width of the laser beam is seven or more times the wavelength of the acoustic wave, and the laser beam is diffracted into frequency modulated orders. A receiver is positioned to detect one or more diffracted orders and reproduce the frequency modulated input signal.

---

This application is a division of application Ser. No. 273,514, filed Apr. 16, 1963, which is a continuation-in-part of application Ser. No. 228,969, filed Oct. 8, 1962.

This invention relates to infrared masers, optical masers, and ultraviolet masers, all of which will be referred to hereinafter as lasers. More particularly, this invention relates to the control of the output radiation from these laser devices.

This invention involves the control of laser action by obtaining a time varying refractive index in the Fabry-Perot optical cavity. One way of obtaining this time varying refractive index is by inserting an ultrasonic cell between the reflective end plates of the laser and propagating ultrasonic energy through the cell. Depending on the relation between the width of the electromagnetic radiation beam in the optical cavity of the laser and the wave length of the sound wave passing through the ultrasonic cell, either refraction or diffraction occurs, refraction occurring when the width of the electromagnetic radiation beam W is much narrower than the sound wave $\lambda^*$ and diffraction occurring when the width of the electromagnetic radiation beam W is much larger than the wave length of the ultarsonic wave. Through the teachings of the present invention and depending on the relationship between the width of the electromagnetic radiation beam in the optical cavity of the laser, the wave length of the sound wave in the ultrasonic cell, and the laser reflectors, the laser output can be controlled to eliminate the random output of some lasers, synchronize laser output with the ultrasonic frequency, amplitude modulate the output of some lasers, or a single, large power pulse can be obtained from the laser, or the laser output can be used for scanning purposes.

A feature of the present invention is a novel system for frequency modulating laser output.

Other features and advantages will be apparent from the specification and claims, and from the accompanying drawings which illustrate an embodiment of the invention.

FIG. 1 is a showing of the control system of the present invention in which an ultrasonic cell is interposed between the laser and a reflecting surface to generate a gated output from the laser.

FIG. 1a is a showing of alternative structure of FIG. 1 wherein the laser, the ultrasonic cell, and the outboard mirror are abutted.

FIG. 2 is a showing of a part of FIG. 1 in which the ultrasonic refraction of the electromagnetic radiation beam in the optical cavity of the laser is illustrated.

FIG. 3 is a showing of the coordination and synchronization between the ultrasonic wave and the laser pulses of the structure of FIG. 1.

FIG. 4 is a showing of an ultrasonic control system for lasers in which laser output can be either frequency modulated or amplitude modulated or both frequency and amplitude modulated.

FIG. 5 is a showing of an ultrasonic control system for lasers in which laser output can be amplitude modulated.

FIG. 5a is a modification of the structure of FIG. 5 for amplitude modulation at a fixed frequency.

Figure 6:
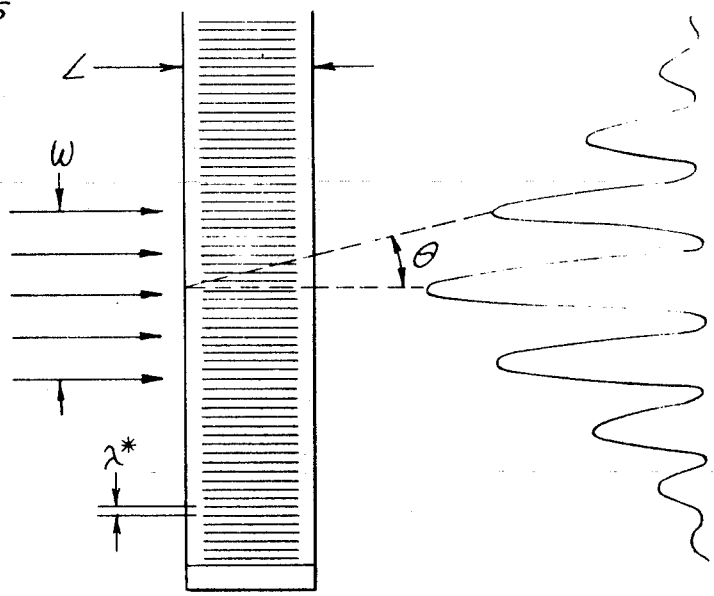
FIG. 6 is a showing of an ultrasonic diffraction pattern created by the systems shown in FIGS. 4 and 5.

Except where otherwise indicated, the following discussion will describe the present invention as used with a ruby laser and a liquid medium ultrasonic cell. However, it is to be expressly understood that any type of laser and any ultrasonic cell either liquid, gas, or solid can be used in the practice of the present invention, or the ultrasonic wave can be propagated through the active portion of the laser system.

Referring now to FIG. 1, a ruby laser 2 is shown with a pumping lamp 4 which has a D.C. power supply 6 and a capacitor bank 8 connected thereto, and a triggering circuit 10 is provided for lamp 4. The lamp 4 and its lighting circuitry are conventional laser pumping apparatus and form no part of the present invention. Laser 2 is a standard ruby laser except that only one end has the usual reflective coating or mirror 12 while the other end is uncoated and the mirror usually present at the now uncoated end is moved outboard as at 14 parallel to mirror 12 and in alignment with the axis of the laser and facing the uncoated end, mirror 14 preferably being more reflective than mirror 12. An ultrasonic cell 16 is interposed beween the uncoated end of the laser and mirror 14 so that cell 16 is in the optical cavity of the laser. Cell 16 has a $BaTiO_3$ transducer 18, an alcohol medium 20 and a $BaTiO_3$ receiver 21, and cell 16 has transparent windows 22 to allow passage of the laser output. Transducer 18 is driven by oscillator 24 to generate an ultrasonic frequency wave in medium 20, and the output from receiver 21 is fed back to oscillaor 24 to supply positive feedback for the oscillator. Cell 16 is excited concomitantly with the pumping of ruby 2. Cell 16 could be a traveling wave cell as well as the standing wave cell described.

In the configuration of FIG. 1 the elements are selected so that the width W of the electromagnetic radiation beam in the optical cavity of laser 2 is much narrower than the wave length $\lambda^*$ of the sound wave in the ultrasonic cell, the ratio $W/\lambda^*$ being approximately 1/4 or less. With W much less than $\lambda^*$ the electromagnetic radiation beam in the optical cavity of laser 2 passing through the ultrasonic field in cell 16 will be refracted back and forth in a sinusoidal manner with the deflection $\theta$ being given by the expression $$\sin \theta = \frac{2\pi \Delta \mu L}{\lambda^*} \cos 2\pi f^* t \qquad (1)$$

where $\Delta \mu$ is the maximum change of the refractive index of the cell medium caused by the ultrasound, L is the path length of the light through the sound field, $f^*$ is the ultrasonic frequency, and $t$ is time. Referring to FIG. 2, which is a simplified schematic of FIG. 1 and in which like elements are numbered as in FIG. 1, the refraction of the electromagnetic radiation beam is illustrated. Thus, when laser 2 is pumped, an emitted beam is passed through the ultrasonic field and is caused to scan mirror 14. When the angle $\theta$ is large the beam reflected from mirror 14 is directed away from laser 2 and the energy loss will prevent laser action from taking place at these angles. However, when $\theta$ is zero or nearly zero the energy incident on mirror 14 is reflected or fed back to laser 2 and laser action will occur. The angle $\theta$ will be zero twice in each cycle of the sound wave, and hence laser action will take place with a pulse repetition frequency of $2f^*$, and this relationship is shown in FIG. 3. In addition, as shown in FIG. 1a, the elements of the system can be brought together to reduce losses. Thus, cell 16 is butted against the uncoated end of ruby 2 and mirror 14 is butted against cell 16. In this configuration it would be desirable to choose the cell medium such that it matches the index of refraction of the active laser material. Only a few watts of ultrasonic power are needed for this ultrasonic feedback modulation technique. For example, a 5 cm. long, 0.6 cm. diameter ruby was operated as in FIG. 1 with a pumping energy of 3360 joules. The ultrasonic cell was excited at 122 kc. with less than 10 watts applied to transducer 18, and a series of evenly spaced laser outputs at $2f^*$ was obtained.

Thus, it can be seen that laser action can be coordinated and synchronized with ultrasonic frequency to produce an ultrasonic feedback modulation of electromagnetic radiation in the optical cavity of a laser whereby evenly spaced laser pulses are realized rather than the usual random output pulses of some laser, or a continuous wave output can be gated or amplitude modulated. In addition, an increase in pulse height, a decrease in pulse with, and a sharpening of pulse rise time are realized through this ultrasonic feedback modulation technique, and there are no moving parts in the system.

It has been stated above that laser action with the ultrasonic feedback modulation of FIG. 1 will occur at the rate of $2f^*$; however, this has presupposed that the ultrasonic frequency is low enough to allow sufficient time for the E energy level population to reach the threshold value every half cycle of the ultrasonic sound wave. If the pumping intensity is not sufficient for the E population level to reach threshold every half cycle of the ultrasonic sound wave, laser action will occur once every full cycle of the sound wave. Thus, it will be understood that the frequency of laser action can be made to vary from $2f^*$, to $1/nf^*$, where $n=1, 2, 3 \ldots$, by regulating the intensity of the pumping of the laser.

The generation of a series of sharp, evenly spaced laser pulses through ultrasonic feedback modulation of laser output described above can find application in a variety of purposes, including, but not limited to, radar, range determination, and communication.

The above-described ultrasonic gating of the output of ruby 2 can also be achieved with mirror 14 deviated from parallelism with mirror 12, i.e. at an acute angle to the axis of ruby 2. Positioning mirror 14 in this manner forces the gating action of ruby 2 to occur at the ultrasonic frequency $f^*$ over a large range of optical pumping intensities and firmly establishes a fixed phase relationship between the ultrasonic frequency and the laser oscillations. Measurements have shown that a 6 minute off parallelism between mirrors 12 and 14 results in a 90° displacement of the laser spikes with respect to the ultrasonic wave form.

Referring now to FIG. 4, there is shown a continuous wave active laser element 102 and parallel reflecting end plates 104 and 106, plate 104 being more reflective than plate 106. Pumping radiation as indicated by the labeled arrows is delivered to laser element 102 by any convenient method, and reflecting end plates or surfaces 104 and 106 could abut or form the ends of active element 102 rather than being separate as shown. An ultrasonic cell 108 having a transducer 110 is positioned to the right of reflective end plate 106 in the path of the emitted beam from laser 102. It will be observed that in the configuration of FIG. 4 ultrasonic cell 108 is located outside of the optical cavity of the laser system defined by reflective end plates 104 and 106. An FM modulator 112 is connected to drive transducer 110 to generate traveling waves of varying frequency in ultrasonic cell 108. A lens 107 receives the laser output from cell 108 and displays it on an opaque surface 109 having an aperture 111 therein, surface 109 being at the focal point of lens 107. A standard type of collimating optics 114 is located to the right of plate 109 and is focused on aperture 111 for transmitting light signals passing through aperture 111.

The system shown in FIG. 4 is operated in the regime where the width W of the emitted beam from laser 102 is much wider than the wave length $\lambda^*$ of the sound wave in the ultrasonic cell, the ratio $W:\lambda^*$ being approximately 7:1 or greater. Under this condition were W much greater than $\lambda^*$, the beam of emitted light from laser 102 is diffracted in passing through the ultrasonic field in cell 108 due to a time varying refractive index caused by the ultrasonic field, the diffraction pattern being in the form of a series of illuminated areas of varying intensity as indicated graphiaclly in FIG. 6 normally diminishing in intensity from the zero order to higher orders.

Referring now to FIG. 6, the beam of emitted laser light is diffracted in passing through the ultrasonic field in cell 108, the diffraction being at angle $\theta$ given by $$\sin \theta \frac{\pm K\lambda}{\lambda^*} \qquad (2)$$

where K equals 0, 1, 2, 3, 4, etc. (diffraction orders), $\lambda$ equals the wave length of the emitter laser beam, and $\lambda^*$ equals the wave length of the sound wave in the ultrasonic cell. For the case of travelling sound waves depicted in FIGS. 4 and 6, the sound wave in the ultrasonic cell acts as a diffraction grating which is moving with the velocity of sound at right angles to the direction of the emitted laser light incident on the ultrasonic cell. As a result of the Doppler effect, the light beam which is bent aside in the diffraction spectra in the direction of propagation of the sound wave experiences an increase in frequency while the light beam diffracted in the opposite direction is lowered in frequency. The frequency $\nu_K$ of the light deflected through an angle $\theta_K$ from its original direction may be calculated from the relation $$\nu_K = \nu_0 \left(1 \pm \frac{2nV}{c}\right) \sin \frac{\theta}{2} \qquad (3)$$

where $\nu_0$ equals the freqeuncy of the laser light incident on the ultrasonic cell 108, $n$ equals the index of refraction of the medium of cell 108, $c$ equals the velocity of light in free space, and V equals the velocity of sound in the medium of cell 108. From Equation 2 and from the fact that $n=c/cn$ where $cn$ is the velocity of light in the medium of cell 108, the following relationship results $$\nu_K = \nu_0 \pm Kf^* \qquad (4)$$

where $f^*$ equals the frequency of the ultrasonic wave in cell 108.

As can be seen from Equation 4, the emitted laser beam, in passing through ultrasonically excited cell 108, will be diffracted into a pattern of lights of different frequency, and the difference in frequencies between the orders of the diffraction pattern will be a direct function of the frequency of the ultrasonic wave in cell 108.

FM modulator 112 delivers an FM signal to transducer 110 in accordance with a message or intelligence that it is desired to transmit, such as a voice message. The frequency modulated signal delivered to transducer 110 generates a frequency modulated traveling wave in ultrasonic cell 108 in accordance with the intelligence to be transmitted, and, in accordance with Equations 2 through 4, the frequency modulation of the ultrasonic wave in cell 108 is superimposed on the diffraction pattern produced by excited cell 108 so that the frequencies of the orders of the diffraction pattern other than the zero order are varied in accordance with the changes in frequency of the ultrasonic wave in cell 108 and hence in accordance with the intelligence that it is desired to transmit.

In the case of a frequency modulated traveling wave in ultrasonic cell 108, the frequency of the zero order of the diffraction pattern remains constant at the frequency of the emitted laser beam, and the frequencies of all other orders in the diffraction pattern change in proportion to and as a function of the change in frequency of the ultrasonic wave in cell 108. Opaque surface 109 is positioned so that aperture 111 only passes selected orders of the diffraction pattern, e.g., the zero and first orders, which are then recollimated by optics 114 for long distance propagation. An optical photoelectric or photoconductor type of superheterodyne receiver 115 known in the art, can be placed to receive the FM light beam from collimating optics 114 and can be tuned to detect the changes in frequencies between the orders of the diffraction pattern passed by aperture 111 and generate electrical signals to reproduce the transmitted information. As an alternative, aperture 111 could be placed to pass only one order of the diffraction pattern, e.g. the first order, and this one order could be beat against the output of a local oscillator. Also, for the transmission of an FM beam, lens 107 and surface 109 could be omitted so that collimating optics 114 would deliver an FM light beam of a mixture of all frequencies in the diffraction pattern to a receiver properly tuned to a band of frequencies.

If each order of the diffraction pattern created by cell 108 is of sufficient intensity to be itself diffracted into a definite pattern, then each order of the diffraction pattern could be passed through a separate ultrasonic cell for frequency modulation. This diffraction of each order of the diffraction pattern could be repeated as many times as a useful diffraction pattern could be obtained by diffracting each order of a diffraction pattern, i.e., as long as the intensity of each order of a diffraction pattern was sufficiently high to be diffracted into a useful pattern. A number of different messages may be imposed on the single light beam emitted from laser 102 through this technique of repeated diffraction, and all of the final diffraction patterns can be recollimated by optics 114 for transmission of the several messages in a single beam of light.

Referring to FIG. 5, a system is shown whereby a pulsed output type laser or a continuous wave laser acn be modulated by ultrasonic diffraction to obtain a series of evenly spaced output pulses of equal magnitude, or whereby a continuous wave laser can be amplitude modulated by ultrasonic diffraction to produce an amplitude modulated output commensurate with intelligence or a message.

A laser system consisting of active laser element 150 and reflecting end plates 152 and 154 has an ultrasonic cell 156 and transducer 158 in the optical cavity, plate 152 being more reflective than plate 154. A lens 162 either in or to the right of cell 156 displays the output from cell 156 on an opaque plate 164 having an aperture 166 therein, plate 164 being at the focal point of lens 162. The inner surface 168 of reflector 154 is curved along a radius such that its focal point is at plate 164 so that light incident on surface 168 from aperture 166 will be reflected back through aperture 166 to lens 162 and thence to laser element 150. Transducer 158 is driven by AM transmitter 160 and, as in the system of FIG. 4, the system of FIG. 5 is operated in the regime where W/λ* is approximately 7/1 or greater so that the electromagnetic energy in the optical cavity of the laser system is diffracted. Plate 164 is placed so that only the zero order of the diffraction pattern passes through aperture 166 and impinges on curved reflecting surface 168.

Figure 7:
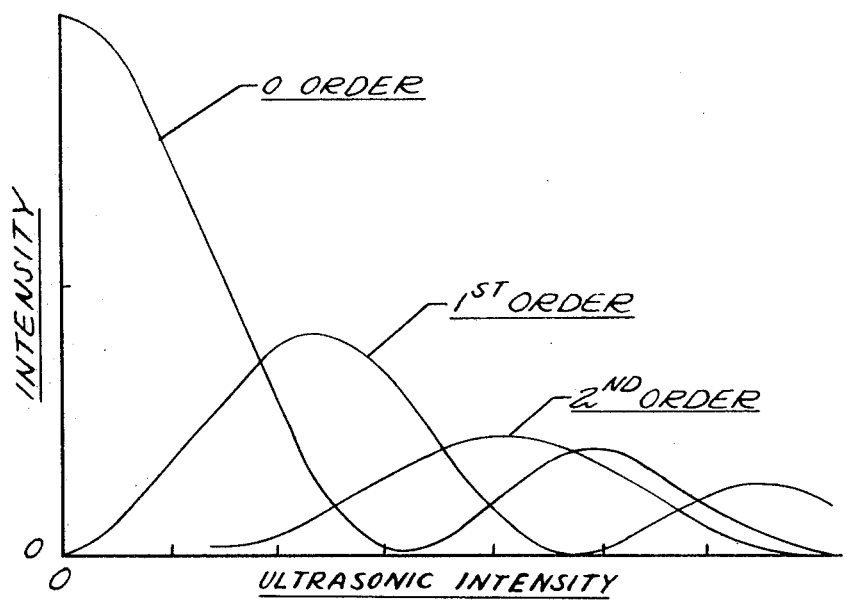
FIG. 7 is a showing of variations in diffraction pattern intensity with variations in ultrasonic intensity.

Referring now to FIG. 7, there is shown in graphic form the relationship between the intensity of the orders of the diffraction pattern and the intensity of the ultrasonic wave in cell 156. As can be seen, the intensity of the zero order falls off to almost zero and then rises slightly as ultrasonic intensity increases while the intensities of the higher orders of the diffraction pattern increase and decrease as a function of ultrasonic intensity. Also, it can be seen that the zero order curve is linear along a great portion of its slope.

The relative intensity of the $m$th order of the diffraction pattern to the $n$th order of the diffraction pattern is given by the expression $$\frac{I_m}{I_n} = \frac{J_m^2\left(\frac{2\pi\Delta\mu L}{\lambda}\right)}{J_n^2\left(\frac{2\pi\Delta\mu L}{\lambda}\right)}$$

where $J_m$ and $J_n$ are the Bessel functions of the $m$th order and the $n$th order of the diffraction pattern, $\Delta\mu$ is the maximum variation of the refractive index in the ultrasonic cell, and L is the length travelled by the electromagnetic energy in the ultrasonic medium and $\lambda$ is the light wave length. The angle that the respective orders of the diffraction pattern make with the initial direction of propagation is given by Equation 2.

Figure 7A:
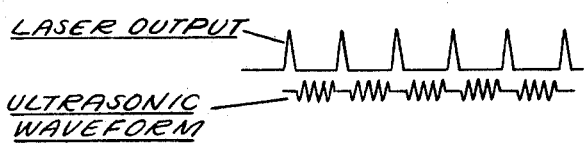
FIG. 7a is a showing of synchronism between laser output and ultrasonic wave form for one mode of operation of the system of FIG. 5.

If ultrasonic cell 156 is excited by an unmodulated output from AM transmitter 160 driving transducer 158 so that an unmodulated uniform traveling wave is set up in cell 156 at an intensity sufficient to suppress the zero order of the diffraction pattern, a high loss will result to the laser system because the zero order of the diffraction pattern will not be fed back to laser element 150. Since aperture 166 is positioned so that only the zero order can pass through the aperture and impinge on surface 168, and since the zero order will be suppressed at this time, lasing action will not occur. Interrupting the ultrasonic wave in cell 156 by interrupting the output from transmitter 160 will remove the diffraction pattern, and the electromagnetic energy of the laser system will be fed back by reflectors 152 and 154 in usual fashion so that lasing action will occur. Similarly, lasing action can also be made to occur by reducing the intensity of the ultrasonic wave to the level wherein the intensity of the zero order of the diffraction pattern is strong, and this strong zero order will be fed back to laser 150 by reflectors 152 and 154 to cause lasing action. Re-establishing the original uniform traveling wave in cell 156 would again establish a diffraction pattern with a suppressed zero order, and lasing action would be interrupted. Thus, as seen in FIG. 7a, the output of the laser system can be coordinated or synchronized with the ultrasonic excitation of cell 156 so that a series of spaced pulses can be obtained from the laser system through ultrasonic diffraction of the electromagnetic energy of the laser in the feedback path. These output pulses can be either evenly spaced or unevenly spaced depending on the spacing of the outputs from transmitter 160.

When the output of transmitter 160 is amplitude modulated in accordance with a message or intelligence, the intensity of the ultrasonic wave in cell 156 will be similarly modulated. As a result, the intensity of the orders of the diffraction pattern produced from the interaction of the ultrasonic wave and the electromagnetic radiation from laser element 150 will be varied, and the zero order intensity can be varied almost linearly over a very wide range of intensities. With aperture 166 positioned as described, only the variation in intensity of the zero order of the diffraction pattern is of interest since only the zero order will affect the amount of feedback to laser 150 to modulate laser output. When laser 150 is of the continuous wave type, the output of the laser system will be amplitude modulated in accordance with the message or intelligence represented by the amplitude modulated output of transmitter 160.

Whether the output from the laser 150 is amplitude modulated for the transmission of a message or intelligence or is modulated as shown in FIG. 7a for the generation of a series of pulses, the output can be recollimated for long distance transmission by optics 170 focused on aperture 166. If mirror 154 were more reflective than mirror 152 no collimating optics would be necessary because laser output would be a collimated beam through mirror 152. The repetitive pulse output can find ready application in systems such as radar and range finding, and the amplitude modulated message output can be detected by well-known photoelectric devices.

Referring now to FIG. 5a, a system similar to that in FIG. 5 is shown in which the traveling wave transmitter 160 and cell 156 of FIG. 5 are replaced by a standing wave oscillator 180 and ultrasonic cell 182 having transducers 184 and 186 connected to the output and return, respectively, of oscillator 180. The remaining structure of FIG. 5a is as in FIG. 5, and the operation of the structure of FIG. 5a differs from the FIG. 5 structure in that a standing ultrasonic wave of a frequency $f^*$ is set up in cell 182 for a given output from oscillator 180. The maximum intensity of the wave in cell 182 will be selected to be at a level sufficient to suppress the zero order of the diffraction pattern, and the structure of FIG. 5a will automatically operate to gate laser output at a frequency of $2f^*$.

The AM modulated systems of FIGS. 5 and 5a could also be operated without lens 162 and plate 164; but the higher orders of the diffraction pattern would be fed back to laser 150 when the zero order was suppressed, and control of laser output would not be as refined.

Referring once again to the structure of FIG. 4, the frequency modulated output of the structure of FIG. 4 can also be amplitude modulated for the transmission of additional messages or intelligence. Thus, switch 116 can be connected to terminal 117 to deliver the output from FM modulator 112 to AM modulator 118 where it is amplitude modulated prior to being delivered to drive transducer 110. Switch 119 would be closed. Thus, an amplitude modulated signal can be imposed on the frequency modulated cell 108 to modulate the intensity of the orders of the diffraction pattern established by cell 108. In this manner, both frequency modulated and amplitude modulated signals can be transmitted by the structure of FIG. 4.

It is to be understood that the invention is not limited to the specific embodiment herein illustrated and described, but may be used in other ways without departure from its spirit as defined by the following claims.

I claim:
1. In a control system for lasers,
    means for generating a laser beam including an active continuous wave laser element having end reflectors defining an optical cavity,
    an ultrasonic cell positioned to pass said laser beam,
    means for generating a frequency modulated signal,
    means for applying said signal to said cell to generate a frequency modulated ultrasonic wave within said cell, said laser beam having a width at least seven times greater than the wave length of said ultrasonic wave,
    and means for directing said laser beam through said cell perpendicular to the direction of propagation of said wave to thereby diffract said laser beam into orders and produce a frequency modulated laser output.

2. A laser control system as in claim 1 and including means to amplitude modulate the frequency modulated signal wherein an amplitude modulated-frequency modulated ultrasonic wave is generated within said cell, all orders of said diffracted laser output being intensity modulated in response to said amplitude modulation, and all diffracted orders except the zero order being frequency modulated by said frequency modulated wave.

3. A laser control system as in claim 1 and including means for passing selected orders of said diffracted laser output.

4. A laser control system as in claim 3 wherein said means for passing selected orders of said diffracted laser output include a lens positioned to receive said diffracted laser output, and an opaque plate having at least one aperture therein positioned substantially at the focal point of said lens.

5. A laser control system as in claim 3 in which the zero order and one other diffracted order are passed, and including means for comparing said zero order and said other diffracted order to reproduce the information on said frequency modulated signal.

6. A laser control system as in claim 3 in which a diffracted order other than the zero order is passed, and including means for beating said diffracted order against a known carrier wave to reproduce the information on said frequency modulated signal.

References Cited

UNITED STATES PATENTS

| | | | |
|---|---|---|---|
| 3,055,258 | 9/1962 | Hurvitz | 350—161 X |
| 3,126,485 | 3/1964 | Ashkin et al. | 331—94.5 X |
| 3,174,044 | 3/1965 | Tien | 350—161 X |

OTHER REFERENCES

"National Electronics Conference" by C. M. Wiley, Electronics, vol. 35, No. 40, Oct. 5, 1962, pp. 39–40.

"Lasers: Devices and Systems—Part III" by S. Vogel et al., Electronics, vol. 34, No. 42, Nov. 10, 1961, pp. 81–85.

RONALD L. WIBERT, Primary Examiner

P. K. GODWIN, JR., Assistant Examiner

U.S. Cl. X.R.

332—7.51; 350—160, 161, 162